(12) United States Patent
Nagakubo et al.

(10) Patent No.: US 10,271,329 B2
(45) Date of Patent: Apr. 23, 2019

(54) WIRELESS COMMUNICATION DEVICE, WIRELESS COMMUNICATION SYSTEM, AND COMPUTER PROGRAM PRODUCT

(71) Applicant: Kabushiki Kaisha Toshiba, Minato-ku (JP)

(72) Inventors: Sakie Nagakubo, Kawasaki (JP); Ren Sakata, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 15/669,156

(22) Filed: Aug. 4, 2017

(65) Prior Publication Data

US 2018/0263034 A1 Sep. 13, 2018

(30) Foreign Application Priority Data

Mar. 10, 2017 (JP) ................. 2017-046147

(51) Int. Cl.
| | | |
|---|---|---|
| *H04L 12/24* | (2006.01) | |
| *H04L 12/26* | (2006.01) | |
| *H04W 24/02* | (2009.01) | |
| *H04W 40/24* | (2009.01) | |
| *H04W 72/04* | (2009.01) | |
| *H04W 76/10* | (2018.01) | |

(52) U.S. Cl.
CPC ......... *H04W 72/0446* (2013.01); *H04L 41/12* (2013.01); *H04L 43/16* (2013.01); *H04W 24/02* (2013.01); *H04W 40/24* (2013.01); *H04W 76/10* (2018.02); *Y02D 70/00* (2018.01); *Y02D 70/22* (2018.01); *Y02D 70/30* (2018.01)

(58) Field of Classification Search
CPC . H04W 72/0446; H04W 24/02; H04W 76/02; H04W 40/24; H04W 76/10; H04L 41/12; H04L 43/16; Y02D 70/00; Y02D 70/30; Y02D 70/22

See application file for complete search history.

(56) References Cited

U.S. PATENT DOCUMENTS

| | | | | |
|---|---|---|---|---|
| 7,639,652 B1* | 12/2009 | Amis | ................... | H04W 40/246 370/238 |
| 2004/0105389 A1* | 6/2004 | Huang | ................ | H04J 14/0283 370/238 |
| 2004/0172467 A1* | 9/2004 | Wechter | .................. | H04L 41/12 709/224 |
| 2004/0174829 A1* | 9/2004 | Ayyagari | ................ | H04L 45/02 370/254 |

(Continued)

FOREIGN PATENT DOCUMENTS

| | | |
|---|---|---|
| JP | 2006-261874 | 9/2006 |
| JP | 2016-54349 | 4/2016 |

*Primary Examiner* — Ivan O Latorre
(74) *Attorney, Agent, or Firm* — Oblon, McClelland, Maier & Neustadt, L.L.P.

(57) ABSTRACT

According to an embodiment, a wireless communication device is one of a plurality of wireless communication devices constituting a wireless communication system. The device includes one or more processors configured to have a network topology construction mode and a time-division wireless communication mode. A first cycle as a communication cycle in the network topology construction mode is shorter than a second cycle as a communication cycle in the time-division wireless communication mode.

6 Claims, 12 Drawing Sheets

(56) References Cited

U.S. PATENT DOCUMENTS

| | | | |
|---|---|---|---|
| 2006/0029007 A1* | 2/2006 | Ayyagari | H04L 45/02 370/310 |
| 2007/0104215 A1* | 5/2007 | Wang | H04L 45/02 370/458 |
| 2008/0075094 A1* | 3/2008 | Ahn | H04B 7/155 370/400 |
| 2009/0103501 A1* | 4/2009 | Farrag | H04W 74/02 370/337 |
| 2010/0035629 A1* | 2/2010 | Soliman | H04W 48/14 455/455 |
| 2010/0136998 A1* | 6/2010 | Lott | H04W 16/14 455/453 |
| 2010/0296455 A1* | 11/2010 | Nakajima | H04W 84/20 370/328 |
| 2011/0051645 A1* | 3/2011 | Hong | H04L 45/48 370/311 |
| 2011/0222506 A1* | 9/2011 | Szymanksi | H04W 72/082 370/330 |
| 2012/0163234 A1* | 6/2012 | Sulc | H04L 61/35 370/254 |
| 2012/0182883 A1* | 7/2012 | Junell | H04W 16/14 370/250 |
| 2012/0230250 A1* | 9/2012 | Kasslin | H04W 72/1215 370/328 |
| 2013/0070605 A1* | 3/2013 | Ghosh | H04W 72/082 370/241 |
| 2016/0021028 A1* | 1/2016 | Koide | H04L 41/12 370/400 |
| 2016/0066319 A1* | 3/2016 | Sakata | H04B 7/2121 370/336 |
| 2016/0241314 A1* | 8/2016 | Ferrante | H04W 72/0406 |
| 2017/0230887 A1* | 8/2017 | Zhang | H04W 36/32 |
| 2017/0295573 A1* | 10/2017 | Klemmensen | H04W 72/0446 |

* cited by examiner

WIRELESS COMMUNICATION DEVICE, WIRELESS COMMUNICATION SYSTEM, AND COMPUTER PROGRAM PRODUCT

CROSS-REFERENCE TO RELATED APPLICATIONS

This application is based upon and claims the benefit of priority from Japanese Patent Application No. 2017-046147, filed on Mar. 10, 2017; the entire contents of which are incorporated herein by reference.

FIELD

Embodiments described herein relate generally to a wireless communication device, a wireless communication system, and a computer program product.

BACKGROUND

Wireless mesh networks using a time-division wireless communication scheme have been disclosed. In a wireless mesh network, communication information transmitted from each wireless node is relayed by a plurality of wireless nodes and transmitted to a root node. Network topology is required to be constructed by communication devices before time-division wireless communication is performed. For example, a technology of constructing network topology by updating relay information each time a new transmitting/receiving station is added to a wireless communication system, a transmitting/receiving station is removed from the wireless communication system, or a communication path has changed.

In the conventional technology, however, network topology is constructed by performing communication at the same regular interval as t in time-division wireless communication unless a new transmitting/receiving station is added to the wireless communication system, a transmitting/receiving station is removed from the wireless communication system, or a communication path has changed. Thus, in the conventional technology, it takes time to construct network topology.

DETAILED DESCRIPTION

According to an embodiment, a wireless communication device is one of a plurality of wireless communication devices constituting a wireless communication system. The device includes one or more processors configured to have a network topology construction mode and a time-division wireless communication mode. A first cycle as a communication cycle in the network topology construction mode is shorter than a second cycle as a communication cycle in the time-division wireless communication mode.

Referring to the accompanying drawings, a wireless communication device, a wireless communication system, and a wireless communication program are described in detail below.

Figure 1:
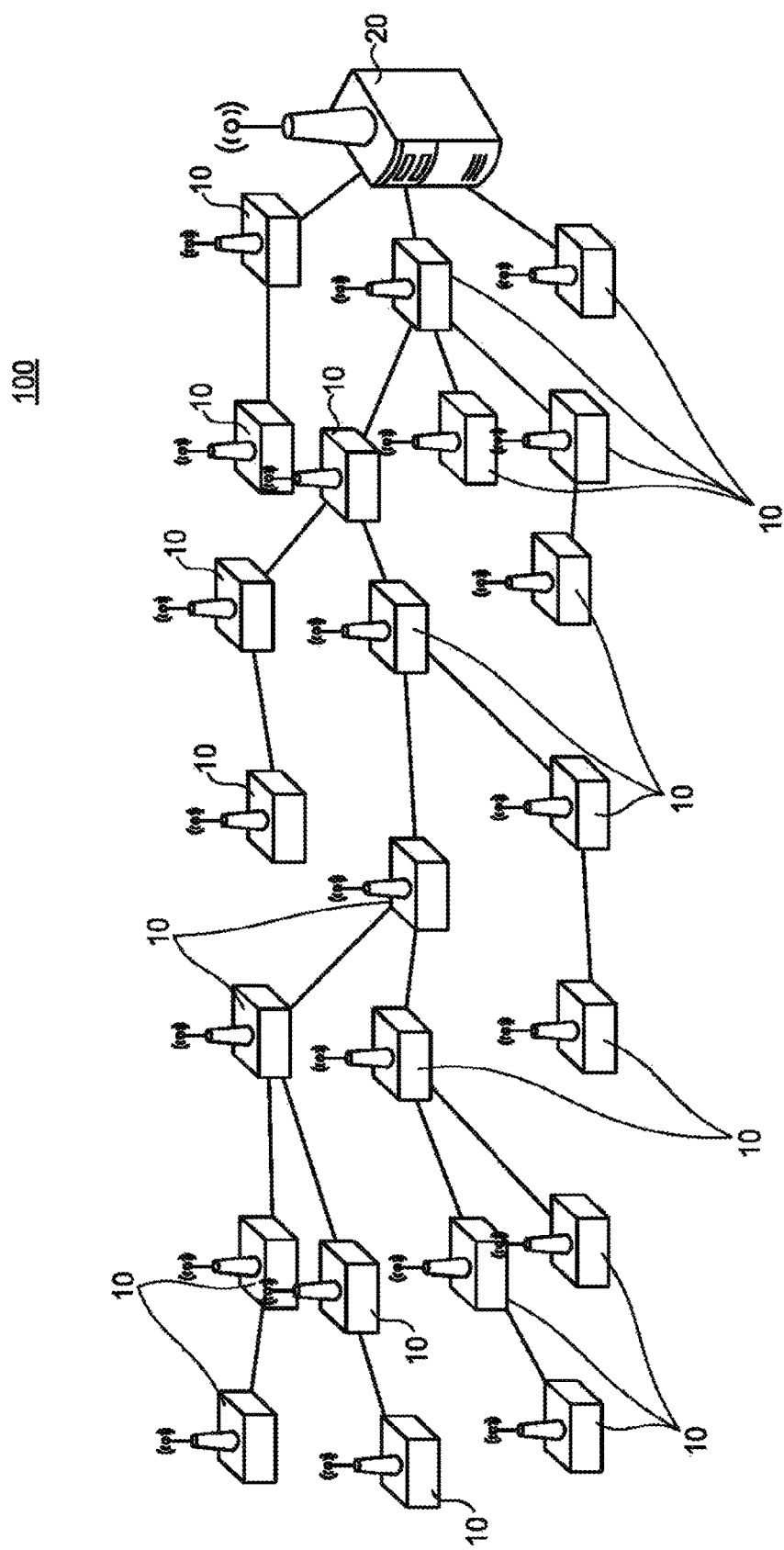
FIG. 1 is a schematic diagram of a wireless communication system.

FIG. 1 is a schematic diagram illustrating an example of a wireless communication system 100 according to the present embodiment. In FIG. 1, the wireless communication system 100 in which network topology is constructed is illustrated as an example.

The wireless communication system 100 includes an aggregation device 20 and a plurality of wireless communication devices 10. The wireless communication system 100 is network topology in which the aggregation device 20 is a root node. In the wireless communication system 100, the wireless communication devices 10 are connected to the aggregation device 20 by wireless in tree structure. The wireless communication system 100 is, for example, a multihop wireless mesh network.

In the wireless communication system 100 in which the network topology is constructed, the wireless communication devices 10 and the aggregation device 20 communicate with one another by time-division wireless communication.

The wireless communication device 10 in the present embodiment is one of the wireless communication devices 10 constructing the wireless communication system 100. The wireless communication devices 10 relay and communicate information by wireless communication in a multihop manner. For example, information transmitted from each wireless communication device 10 is transmitted to the aggregation device 20 directly or via other wireless communication devices 10. The aggregation device 20 aggregates information transmitted from each wireless communication device 10. The aggregation device 20 is, for example, a server having a wireless communication function.

Figure 2:
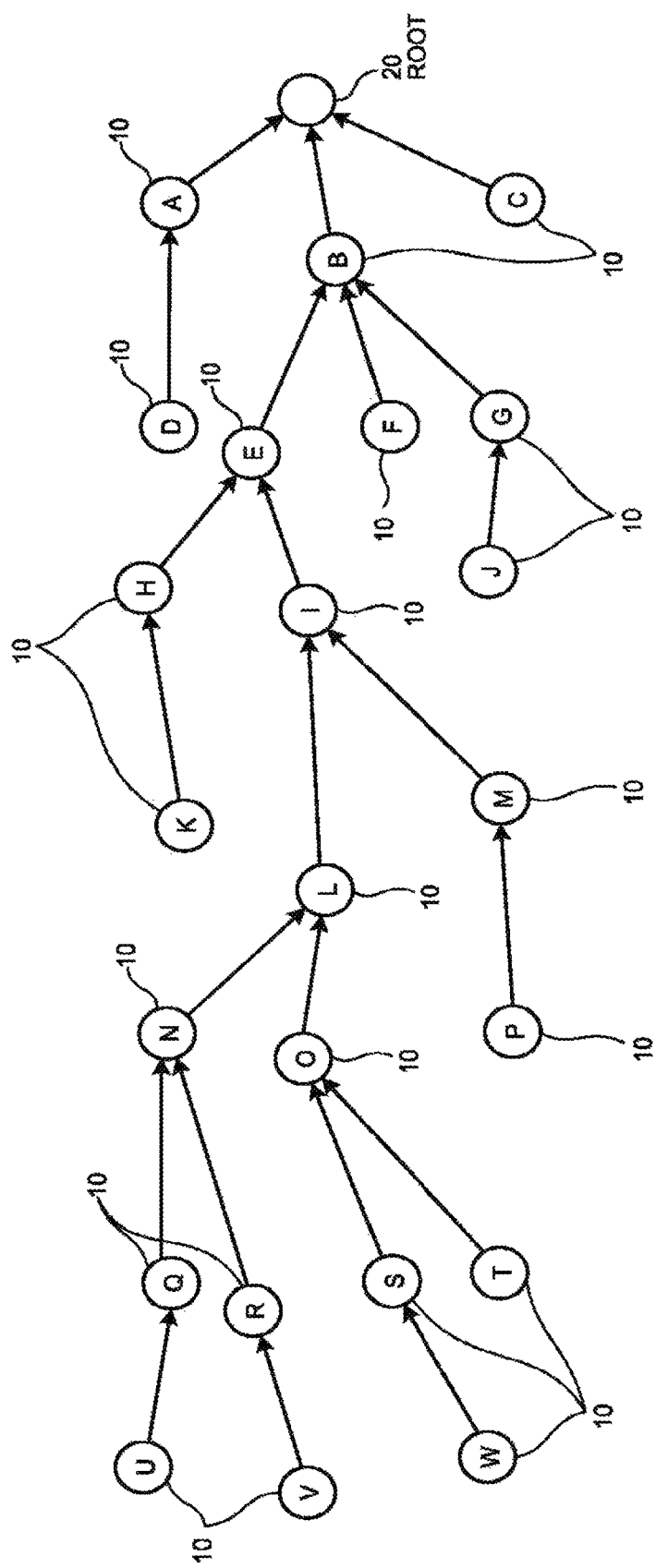
FIG. 2 is a schematic diagram of uplink communication from wireless communication devices to an aggregation device.

FIG. 2 is a schematic diagram illustrating an example of uplink communication from each wireless communication device 10 to the aggregation device 20. In FIG. 2, an alphabet denoting each wireless communication device 10 is an example of identification information (ID) of each wireless communication device 10. The "root" denoting the aggregation device 20 indicates the root node. The arrows in FIG. 2 indicate the transmission direction of information. The source of the arrows indicates a transmission source of information, and the destination of the arrows indicates a transmission destination of information.

In the following description, a wireless communication device 10 is simply used to describe an unspecified wireless communication device 10. A wireless communication device 10 with an alphabet is used to describe a specified wireless communication device 10.

In the present embodiment, another wireless communication device 10 to which a wireless communication device 10 is connected and which is located on the upstream side closer to the aggregation device 20 is defined as a parent node. Being closer to the aggregation device 20 means having a smaller number of hops to the aggregation device 20. Similarly, another wireless communication device 10 to which a wireless communication device 10 is connected and which is located on the downstream side farther from the aggregation device 20 is defined as a child node. Being farther from the aggregation device 20 means having a larger number of hops to the aggregation device 20.

For example, the parent node of the wireless communication device 10 identified by "I" is the wireless communication device 10 identified by "E". The child nodes of the wireless communication device 10 identified by are the wireless communication device 10 identified by "L" and the wireless communication device 10 identified by "M".

In the wireless communication system 100 in which network topology is constructed, the wireless communication devices 10 and the aggregation device 20 communicate with one another by time-division wireless communication. The state in which network topology is constructed is the state in which connection destination information (to be described in detail later) is decided in each wireless communication device 10 and the aggregation device 20. In other words, the state in which network topology is constructed is the state in which the wireless communication system 100 is ready to execute time-division wireless communication.

In the wireless communication system 100, time-division wireless communication is performed by a publicly known method. For example, a method disclosed in Japanese Patent Application Laid-open No. 2016-54349 is used as the method of time-division wireless communication.

Figure 3:
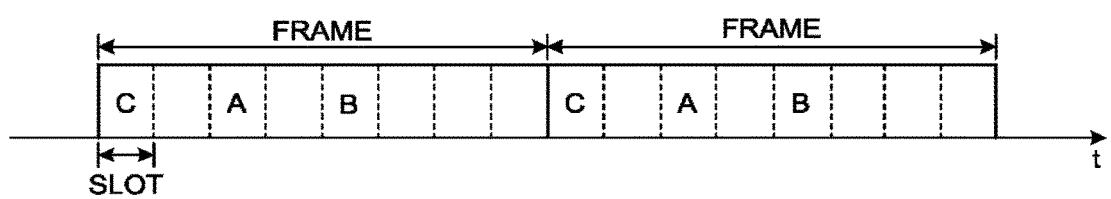
FIG. 3 is an explanatory diagram of time-division wireless communication.

FIG. 3 is an explanatory diagram of an example of time-division wireless communication. In the wireless communication system 100, a communication cycle for time-division communication (hereinafter referred to as "second cycle") is determined in advance. In time-division wireless communication, the wireless communication system 100 operates by repeating frames whose units are the second cycle. Specifically, the wireless communication devices 10 and the aggregation device 20 included in the wireless communication system 100 perform time-division wireless communication by repeating frames of the second cycle at the same timing.

A frame is divided into slots in a time division manner. Each slot is allocated with any one of one or more wireless communication devices 10 and the aggregation device 20. In other words, each of slots included in a frame is allocated as a communication slot used for any one of the wireless communication devices 10 and the aggregation device 20 to communicate communication information. The wireless communication devices 10 and the aggregation device 20 communicate communication information at timings corresponding to the allocated slots in each frame. The communication information is information to be transmitted and received during time-division wireless communication.

In the example illustrated in FIG. 3, among eight slots constituting a frame, the first slot is allocated with the wireless communication device 10 identified by "C", the third slot is allocated with the wireless communication device 10 identified by "A", and the fifth slot is allocated with the wireless communication device 10 identified by "B". In this case, in time-division wireless communication, the wireless communication device 10 identified by "C" communicates communication information for every second cycle at the timing corresponding to the first slot in the frame. The frame may include a slot that is not allocated to any of the wireless communication devices 10 and the aggregation device 20.

Figure 4:
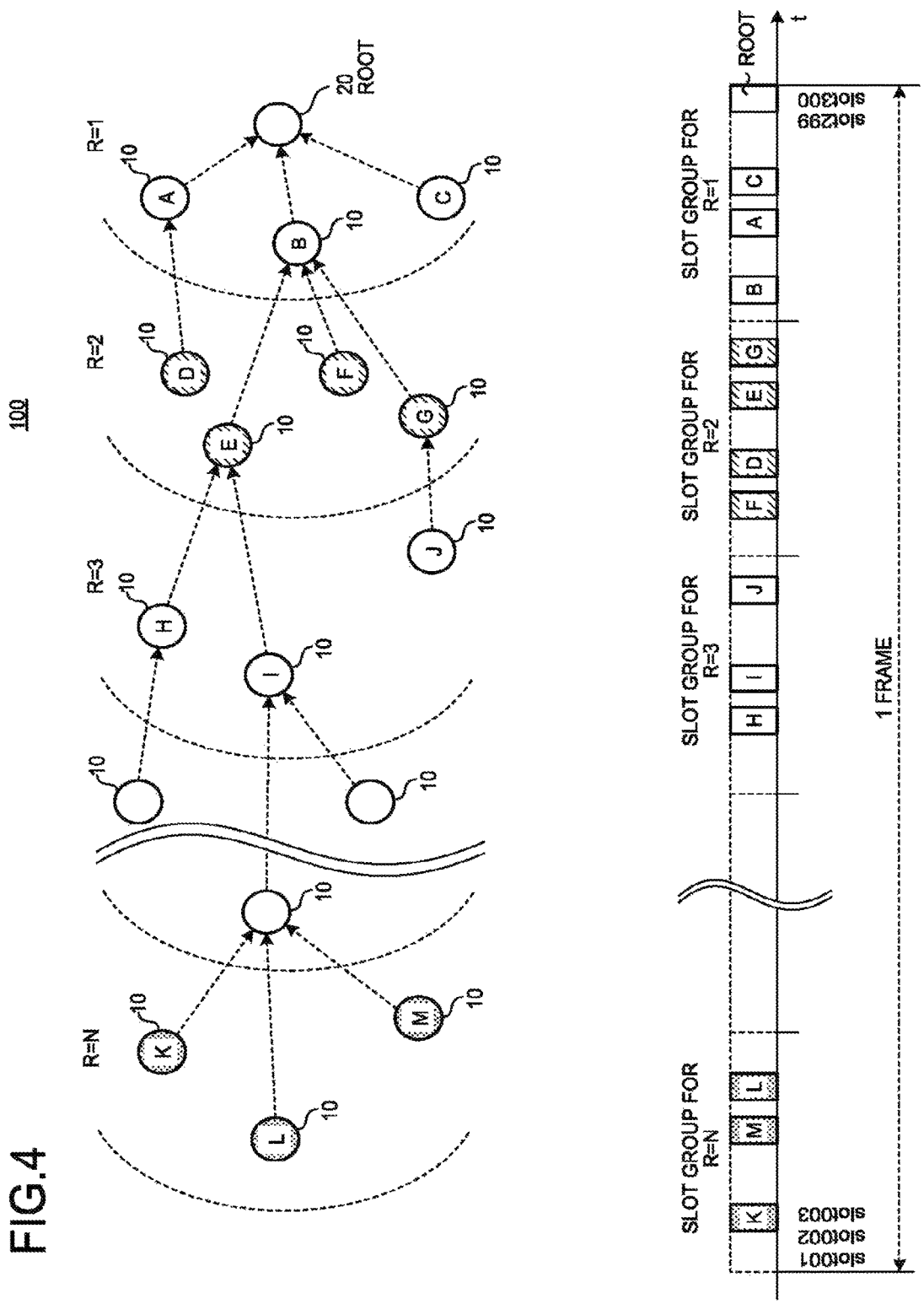
FIG. 4 is an explanatory diagram of a slot allocation method.

FIG. 4 is an explanatory diagram of an example of a slot allocation method in the wireless communication system 100. In the wireless communication system 100, a rank value R is set to each wireless communication device 10 and the aggregation device 2C. The rank value R is the number of hops from the wireless communication device 10 to the aggregation device 2C (root node). The rank value R is set by each of the aggregation device 20 and the wireless communication devices 10.

For example, the numbers of hops of the wireless communication devices 10 identified by "A", "B", and "C", respectively, to the aggregation device 20 are "1". Thus, a rank value R of "1" is set to the wireless communication devices 10 identified by "A", "B", and "C".

For example, it is assumed that the maximum number of hops to the aggregation device 20 in the wireless communication system 100 in which network topology is constructed is N (N is an integer of 2 or larger). In this case, a rank value R of any one of 1 to N is set to each wireless communication device 10 included in the wireless communication system 100.

In the wireless communication system 100, slots constituting a frame are divided into slot groups including slots. Each slot group includes slots. The wireless communication system 100 allocates wireless communication devices 10 to slots included in a slot group.

Slot groups are set so as not to overlap with one another. The number of slot groups included in each frame is equal to or larger than the maximum number of hops N in the wireless communication system 100.

In the wireless communication system 100 in the present embodiment, a slot group is allocated to each group of wireless communication devices 10 having the same rank value R.

Specifically, the wireless communication system 100 allocates each of slot groups with a rank value R. In this case, the wireless communication system 100 allocates a slot group having the latest timing in a frame with the highest rank value of "1". For example, the wireless communication system 100 allocates a slot group having the earliest timing in the frame with the lowest rank value of "N". The lowest rank value of "N" is a value equal to or larger than the maximum number of hops in the wireless communication system 100.

The wireless communication system 100 allocates each slot group with wireless communication devices 10 having the same rank value R as the rank value R allocated to each slot group. Specifically, the wireless communication system 100 allocates each group of wireless communication devices 10 having the same rank value R with a slot group having the same rank value R as that of the group of the wireless communication devices 10.

For example, in FIG. 4, slots included in a slot group for a rank value of "N" slot group for R=N) are allocated to the wireless communication devices 10 identified by "K", "L", and "M" whose rank values are set to "N".

In time-division wireless communication, the wireless communication devices 10 and the aggregation device 2C included in the wireless communication system 100 perform processing of communicating communication information at timings corresponding to allocated communication slots in a frame for every second cycle, which is the period of the frame. Through this processing, time-division wireless communication is performed in the wireless communication system 100.

A time period for a sleep state may be provided in a frame used for time-division communication. The sleep state is the state in which the wireless communication device 10 stops calculation processing and its communication function and only counts the time. In the sleep state, information is not transmitted and received, and hence power consumption of the wireless communication device 10 is reduced.

Network topology of the wireless communication system 100 needs to be constructed before time-division wireless communication is performed. The state in which network topology is constructed is, as described above, the state in which connection destination information is decided in each wireless communication device 10 and the aggregation device 20.

The connection destination information is information indicating a connection relation of each wireless communication device 10 with respect to other wireless communication devices 10 in the wireless communication system 100 in which network topology is constructed. The connection destination information used in the aggregation device 20 is information indicating a connection relation with respect to the wireless communication devices 10 in the wireless communication system 100 in which network topology is constructed.

Specifically, the connection destination information used in the wireless communication device 10 includes the number of hops from its own wireless communication device 10 to the aggregation device 20, node IDs (second identification information) of other wireless communication devices 10 as child nodes, and a node ID (first identification information) of another wireless communication device 10 or the aggregation device 20 as a parent node.

The node ID is identification information of each of the wireless communication devices 10 and the aggregation device 20.

The connection destination information used in the wireless communication device 10 may include the number of hops from a parent node to the aggregation device 20, the number of hops of a child node to the aggregation device 20, node IDs of child nodes (grandchild nodes) connected to each of child nodes, the number of hops of a grandchild node to the aggregation device 20, and node IDs of child nodes connected to the grandchild node, and the number of hops thereof to the aggregation device 20.

The connection destination information used in the aggregation device 20 includes nodes ID of other wireless communication devices 10 as child nodes. The connection destination information used in the aggregation device 20 may include the number of hops of a child node to the aggregation device 20, node IDs of child nodes (grandchild nodes) connected to each of child nodes, the number of hops of a grandchild node to the aggregation device 20, node IDs of child nodes connected to the grandchild node, and the number of hops thereof to the aggregation device 20.

The wireless communication system 100 has a network topology construction mode for constructing network topology and a time-division wireless communication mode for performing time-division wireless communication. The wireless communication system 100 in the present embodiment executes the network topology construction mode for constructing network topology to construct network topology, and then executes the time-division wireless communication mode to perform time-division wireless communication. Specifically, the wireless communication system 100 operates in communication modes including the network topology construction mode and the time-division wireless communication mode.

Figure 5:
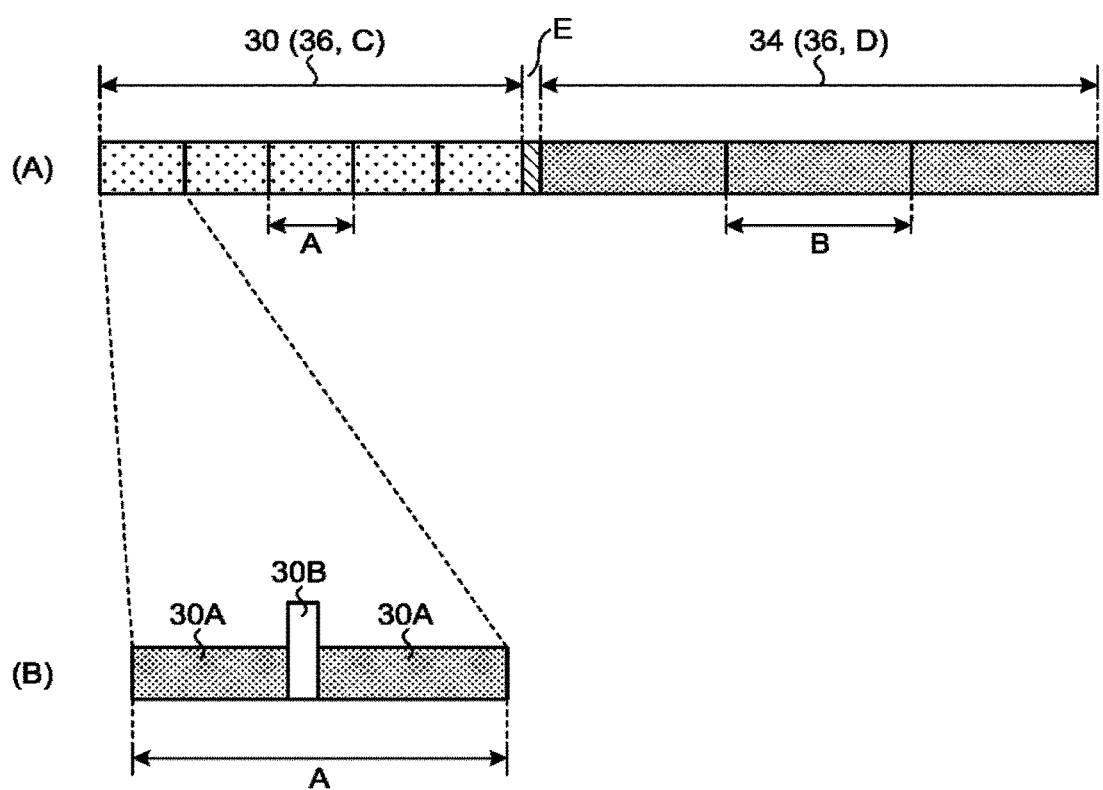
FIG. 5 is an explanatory diagram of communication modes.

FIG. 5 is an explanatory diagram of a communication mode 36 in the wireless communication system 100 according to the present embodiment. In FIG. 5, (B) will be referred to later.

The communication mode 36 in the wireless communication system 100 includes a network topology construction mode 30 and a time-division wireless communication mode 34. The network topology construction mode 30 is a communication mode in which communication is performed at a communication cycle of a first cycle A to construct network topology. The time-division wireless communication mode 34 is a communication mode 36 in which time-division wireless communication is performed at a communication cycle of a second cycle (period corresponding to one frame) B.

The wireless communication system 100 executes the network topology construction mode 30 to construct the network topology as illustrated in FIG. 1 and FIG. 2, and thereafter executes the time-division wireless communication mode 34 to perform the above-mentioned time-division wireless communication.

The first cycle and the second cycle are communication cycles that are used consistently in the wireless communication system 100. Specifically, the wireless communication devices 10 and the aggregation device 20 included in the wireless communication system 100 repeat the communication at the first cycle at the same timing, thereby executing the network topology construction mode 30. The wireless communication devices 10 and the aggregation device 20 included in the wireless communication system 100 repeat the communication at the second cycle at the same timing, thereby executing the time-division wireless communication mode 34. Specifically, the wireless communication system 100 is a wireless communication system configured such that the communication cycle in the network topology construction mode 30 is the first cycle and the communication cycle in the time-division wireless communication mode 34 is the second cycle.

For example, the wireless communication devices 10 and the aggregation device 20 included in the wireless communication system 100 have a publicly known mechanism for synchronizing timings with one another. In this manner, the wireless communication devices 10 and the aggregation device 20 included in the wireless communication system 100 communicate at the same timing in the same mode (network topology construction mode 30 or time-division wireless communication mode 34). The wording "communication" includes transmission and reception. Depending on the communication state and the number of hops to the aggregation device 20, a wireless communication device 10 that does not perform communication may exist in the period of the first cycle during which other wireless communication devices 10 perform communication.

Conventionally, it has taken much time to construct network topology. For example, in the conventional case, communication is performed in a network topology construction period at the same communication cycle (specifically, second cycle B) as that in the time-division wireless communication period. Thus, a long period is needed until network topology including all wireless communication devices 10 included in the wireless communication system 100 is constructed. In the conventional case, wireless communication device 10 are frequently connected to another wireless communication device 10 having poor communication quality during the construction of network topology, and communication interruption frequently occurs.

In the wireless communication system 100 in the present embodiment, the first cycle A that is the communication cycle in the network topology construction mode 30 is shorter than the second cycle B that is the communication cycle in the time-division wireless communication mode 34.

For example, it is preferred that the first cycle A be equal to or smaller than the sum of a time period required for transmission and reception of communication connection information between the wireless communication device 10 and the maximum number of child nodes when the maximum number of child nodes that can be connected to one wireless communication device 10 are connected and a time period required for transmission and reception of communication connection information between the wireless communication device 10 and a parent node.

For example, it is preferred that the first cycle A be longer than a time period required for transmission and reception of communication connection information between a wireless communication device 10 and a parent node of the wireless communication device 10.

The communication connection information is information to be communicated in the network topology construction mode 30. The communication connection information includes the above-mentioned connection destination information and a node ID of the wireless communication device 10 at the transmission source of the communication connection information. The communication connection information may include information other than the above-mentioned information. For example, the communication connection information may include a signal indicating signal intensity (received signal strength indication (RSSI)) of a radio signal.

In the wireless communication system 100, the first cycle A and the second cycle B are consistently used in the wireless communication devices 10 and the aggregation device 20 included in the wireless communication system 100, and time-synchronized communication is performed such that the start timing and end timing of each cycle are the same in the wireless communication system 100. A publicly known method is used as the method of time synchronization. In this manner, the network topology construction mode 30 and the time-division wireless communication mode 34 are executed in the wireless communication system 100.

Next, each of the wireless communication device 10 and the aggregation device 20 is described in detail.

Figure 6:
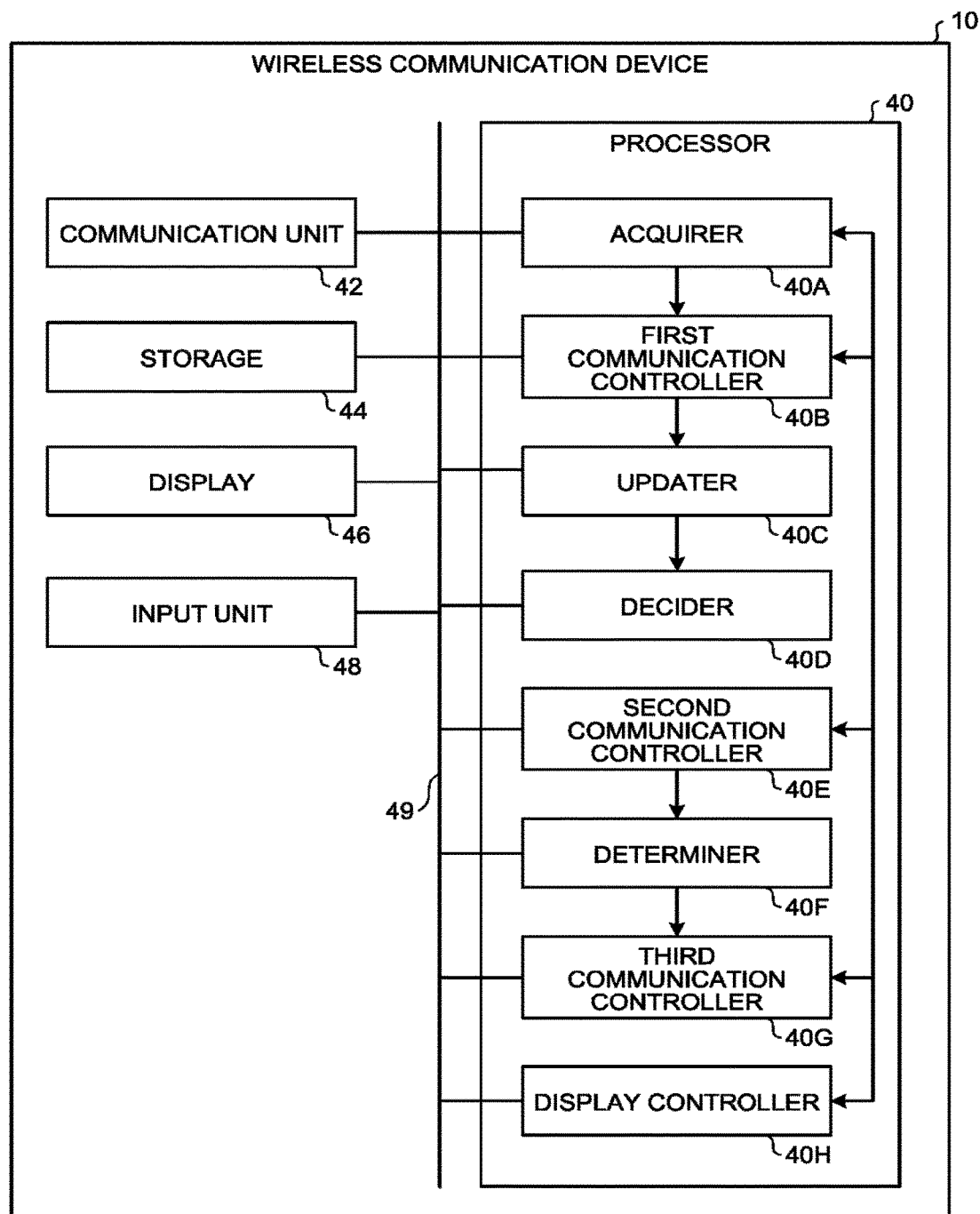
FIG. 6 is a schematic diagram of a functional configuration of the wireless communication device.

FIG. 6 is a schematic diagram illustrating an example of a functional configuration of the wireless communication device 10. The wireless communication device 10 includes a processor 40, a communication unit 42, a storage 44, a display 46, and an input unit 48. The processor 40, the communication unit 42, the storage 44, the display 46, and the input unit 48 are connected via a bus 49.

The communication unit 42 performs wireless communication with other wireless communication devices 10 and the aggregation device 20. The communication unit 42 is, for example, a communication antenna.

The storage 44 stores therein various kinds of data. The storage 44 is, for example, a semiconductor memory element, such as a random access memory (RAM) and a flash memory, a hard disk, or an optical disc. The storage 44 may be formed of a plurality of storage media.

In the present embodiment, the storage 44 stores therein connection destination information. The connection destination information is updated by processing described later.

The display 46 displays various kinds of information. The display 46 is a publicly known display. In the present embodiment, the display 46 displays a display screen generated by the processor 40.

The input unit 48 is an input device configured to receive an instruction from a user. The input unit 48 is, for example, a mouse, a keyboard, or a touch pen. The display 46 and the input unit 48 may be integrated. In this case, the display 46 and the input unit 48 are, for example, a touch panel.

The processor 40 executes various kinds of processing in the wireless communication device 10.

In the present embodiment, in the network topology construction mode 30, the communication unit 42 communicates communication connection information with other wireless communication devices 10 for each first cycle A. The processor 40 sets a connection destination based on the communication connection information. In the time-division wireless communication mode 34, the communication unit 42 transmits communication information in a slot group earlier than a slot group through which the latest connection destination at the end of the network topology construction mode 30 transmits communication information among slot groups included in the second cycle B.

Details are described below. The processor 40 includes an acquirer 40A, a first communication controller 40B, an updater 40C, a decider 40D, a second communication controller 40E, a determiner 40F, and a third communication controller 40G. The processor 40 may further include a display controller 40H. The acquirer 40A, the first communication controller 40B, the updater 40C, the decider 40D, the second communication controller 40E, the determiner 40F, the third communication controller 40G, and the display controller 40H are implemented by, for example, one or more processors. For example, each of the above-mentioned units may be implemented by a processor such as a central processing unit (CPU) executing a computer program, that is, by software. Each of the above-mentioned units may be implemented by a processor such as a dedicated integrated circuit (IC), that is, by hardware. Each of the above-mentioned units may be implemented by a combination of software and hardware. When processors are used, each processor may implement one of the units or implement two or more of the units.

The term "processor" used in the present embodiment and embodiments described later means, for example, a CPU, a graphics processing unit (GPU), or a circuit such as an application specific integrated circuit (ASIC) and a programmable logic device (for example, a simple programmable logic device (SPLD), a complex programmable logic device (CPLD), and a field programmable gate array (FPGA)).

The processor implements each of the above-mentioned units by reading and executing computer programs stored in the storage 44. A computer program may be directly incorporated in a circuit of the processor instead of storing a computer program in the storage 44. In this case, the processor implements each of the above-mentioned units by reading and executing the computer programs incorporated in the circuit.

The acquirer 40A acquires period information, first cycle information, and second cycle information.

The period information is information indicating a network topology construction period C (see (A) of FIG. 5) in the wireless communication system 100. The period information may be information indicating a predetermined period, or may be a period corresponding to network topology in the previous time-division wireless communication. The period information may indicate a time-division communication period D as well. In this case, the time-division communication period D can be executed after the lapse of the network topology construction period C, and then the network topology construction period C can be executed again.

The network topology construction period C can be set in accordance with the network topology in the previous time-division wireless communication. For example, it is preferred that the network topology construction period C be information indicating a period based on the product of the first cycle A and the maximum number of hops in the wireless communication system 100 or the product of the first cycle A and the number of the communication devices included in the wireless communication system 100. In this case, the period information is set by the aggregation device 20 in the previous time-division wireless communication and transmitted from the aggregation device 20 to each wireless communication device 10.

The period information indicating the network topology construction period may be either of information that represents the network topology construction period C by time or information that represents the number of first cycles A by a timer value. When the period information is represented by time, the period information indicating the network topology construction period C is, for example, information indicating n seconds (n is a positive number larger than 0). When the period information is represented by a timer value, the timer value indicating the number of repetitions of the first cycle A in the network topology construction period C is, for example, information indicating M times (M is a positive integer larger than 1).

For example, the acquirer 40A acquires period information from the storage 44. In this case, the period information only needs to be stored in advance in the storage 44 of the wireless communication device 10. Pieces of period information stored in the wireless communication devices 10 and the aggregation device 20 included in the reless communication system 100 are the same period information (information indicating the same length of period). The acquirer 40A reads period information from the storage 44, thereby acquiring the period information.

The acquirer 40A may acquire the period information from the aggregation device 20 directly or from the aggregation device 20 via another wireless communication device 10. In this case, for example, each wireless communication device 10 communicates the above-mentioned communication connection information further including the period information received from the aggregation device 20. In this manner, the acquirer 40A in the wireless communication device 10 acquires the period information.

The first cycle information is information indicating the first cycle A. The second cycle information is information indicating the second cycle B.

For example, the acquirer 40A reads the first cycle information and the second cycle information from the storage 44. In this manner, the acquirer 40A acquires the first cycle information and the second cycle information. In this case, the first cycle information and the second cycle information only need to be stored in advance in the storage 44 of the wireless communication device 10.

Pieces of first cycle information stored in the wireless communication devices 10 and the aggregation device 20 included in the wireless communication system 100 are information indicating the same cycle (cycle having the same length), and pieces of second cycle information are also information indicating the same cycle (cycle having the same length). The acquirer 40A reads first cycle information and second cycle information from the storage 44, thereby acquiring the first cycle information and the second cycle information.

Next, the first communication controller 40B is described. The first communication controller 40B controls the communication unit 42 and the updater 40C to execute the network topology construction mode 30.

The network topology construction mode is communication mode in which first processing is performed in the network topology construction period C for each first cycle A. The first processing is a series of processing involving the communication of communication connection information with other wireless communication devices 10 and the generation of connection destination information based on communication connection information.

Specifically, the first communication controller 40B receives first cycle information indicating a first cycle A and period information from the acquirer 40A.

The first communication controller 40B performs first processing in the network topology construction period C for every first cycle A indicated by the first cycle information.

In FIG. 5, (B) is a schematic diagram of the first processing. During the first cycle A, the first communication controller 40B performs reception 30A of communication connection information from other wireless communication devices 10 and transmission 30B of communication connection information to other wireless communication devices 10. For example, each wireless communication device 10 can perform the transmission 30B of the communication connection information once for every first cycle A.

Each time the first communication controller 40B receives new communication connection information from another wireless communication device 10, the first communication controller 40B uses the received communication connection information to generate connection destination information, and overwrites and stores the connection destination information in the storage 44. Specifically, the first communication controller 40B controls the updater 40C to store the generated latest connection destination information in the storage 44. For example, the updater 40C updates the connection destination information under control of the first communication controller 40B. Thus, the connection destination information in the storage 44 is updated under control of the first communication controller 40B. In this manner, in the network topology construction mode, the communication unit 42 communicates communication connection information with other wireless communication devices 10 under control of the first communication controller 40B for every first cycle A. The updater 40C in the processor 40 sets a connection destination based on the communication connection information.

For example, one of the other wireless communication devices 10 can be set as a connection destination on the basis of the received communication connection information. For example, another wireless communication device 10 which has a small number of hops and whose number of child nodes has not reached a connectable maximum number of nodes can be set as a connection destination. Connection destination information is generated on the basis of the set connection destination.

Each time the first communication controller 40B receives new communication connection information from another wireless communication device 10, the first communication controller 40B uses the received communication connection information to calculate the number of hops from the wireless communication device 10 to the aggregation device 20 by using a publicly known method. The first communication controller 40B controls the storage 44 to store therein connection destination information including the calculated number of hops.

The first communication controller 40B performs control of repeatedly executing the above-mentioned first processing for every first cycle A during the network topology construction period C acquired by the acquirer 40A.

Thus, connection destination information that is overwritten at the last in the network topology construction period C is determined as connection destination information used in the wireless communication device 10, and is used in the time-division wireless communication mode 34.

In other words, the connection destination information is updated and determined in the network topology construction period C in each of wireless communication devices 10 included in the wireless communication system 100, with the result that network topology of the wireless communication system 100 is constructed.

The first communication controller 40B may execute the network topology construction mode 30 until the elapsed time from the start of the execution of the network topology construction mode 30 is determined to match with a time period indicating the network topology construction period C. For example, the first communication controller 40B may execute the network topology construction mode 3C until the number of repetitions of the first cycle A from the start of the execution of the network topology construction mode 30 is determined to match with a timer value (maximum value of number of repetitions) indicating the network topology construction period C. In this manner, the first communication controller 40B may perform control of repeatedly executing the above-mentioned first processing for every first cycle A during the network topology construction period C acquired by the acquirer 40A.

When the timer value indicating the network topology construction period C indicates the maximum value of the number of repetitions of the first cycle A, the first communication controller 40B counts up the count value from "1", which is the initial value of the count value, by one each time the first processing is executed at the first cycle A. The first communication controller 40B determines that the network topology construction period C ends when the count value matches with the timer value indicating the maximum value of the number of repetitions.

The first communication controller 40B may determine that the network topology construction period C ends by counting down the count value. In this case, the first communication controller 40B may acquire an initial value of the count value and a finish value smaller than the initial value as the timer value indicating the network topology construction period C. The first communication controller 40B may count down the initial value of the count value by one each time the first processing is executed at the first cycle A. When the count value matches with the finish value, the first communication controller 40B determines that the network topology construction period C ends.

Next, the decider 40D is described. The decider 40D performs processing of deciding a communication slot in a decision period E (see (A) of FIG. 5) between the network topology construction period C and the time-division wireless communication period D.

Specifically, the decider 40D decides a communication slot used for the wireless communication device 10 to communicate communication information among slots included in a frame of the second cycle B that is divided into slots in a time division manner, in accordance wits) connection destination information acquired in the network topology construction mode 30. For the communication slot decision method, a publicly known method is used (for example, Japanese Patent Application Laid-open No. 2016-54349).

For example, the decider 40D sets the number of hops from the wireless communication device 10 to the aggregation device 20, which is included in connection destination information acquired in the network topology construction mode 30, as a rank value R.

The decider 40D divides a frame into slot groups, and allocates rank values R to the slot groups. In the present embodiment, the processing of dividing a frame into slot groups and the allocation of rank values R to the slot groups are performed by, for example, the aggregation device 20. The decider 40D only needs to acquire information indicating slot groups and rank values R allocated to the slot groups from the aggregation device 20 directly or from the aggregation device 20 via another wireless communication device 10.

The decider 40D allocates communication slots of the wireless communication device 10 to slots included in slot groups having the same rank value R in the frame. In this manner, the decider 40D decides communication slots used for the wireless communication device 10 to communicate communication information.

The second communication controller 40E executes the time-division wireless communication mode 34 in the time-division wireless communication period D. The time-division wireless communication mode 34 is a communication mode 36 in which second processing is performed for every second cycle B. The second processing is processing of communicating communication information at a timing corresponding to a communication slot in a frame. The communication information includes a node ID of the wireless communication device 10, node IDs of other wireless communication devices 10 at transmission destinations, and information indicating communication content. The information indicating the communication content includes information acquired by a sensor and information indicating communication quality.

Thus, in the time-division wireless communication mode, under control of the processor 40, the communication unit 42 transmits communication information in a slot group earlier than a slot group through which the latest connection destination at the end of the network topology construction mode transmits communication information among slot groups included in the second cycle B.

The determiner 40F determines whether to switch the communication mode 36 to the network topology construction mode 30 during the execution of the time-division wireless communication mode 34.

For example, the determiner 40F determines to switch the communication mode 36 when at least one of the following conditions is satisfied: the condition that the elapsed time from the start of the execution of the time-division wireless communication mode 34 has exceeded a predetermined time, the condition that the number of times of execution of second processing from the start of the execution of the time-division wireless communication mode 34 has exceeded a predetermined number of times, and the condition that switching instruction information indicating a switching instruction is received is satisfied.

The above-mentioned predetermined time may be set in advance. For example, the storage 44 may store therein the above-mentioned predetermined time in advance. The determiner 40F reads the predetermined time from the storage 44, and determines to switch the communication mode 36 to the network topology construction mode 30 when the elapsed time from the start of the execution of the time-division wireless communication mode 34 has exceeded the predetermined time.

The predetermined number of times of execution of the second processing only needs to be set in advance. For example, the storage 44 may store therein the above-mentioned predetermined number of times in advance. The determiner 40F only needs to read the predetermined number of times from the storage 44, and determine to switch the communication mode 36 to the network topology construction mode 30 when the number of executions of the second processing from the start of the execution of the time-division wireless communication mode 34 has exceeded the predetermined number of times.

The switching instruction information only needs to be received from the aggregation device 20 directly or from the aggregation device 20 via another wireless communication device 10. The communication unit 42 receives the switching instruction information from the aggregation device 20 or from the aggregation device 20 via another wireless communication device 10. The determiner 40F only needs to determine to switch the communication mode 36 from the time-division wireless communication mode 34 to the network topology construction mode 30 when the communication unit 42 receives the switching instruction information.

When the determiner 40F determines to switch the communication mode 36, the third communication controller 40G controls the second communication controller 40E and the first communication controller 40B to switch the communication mode 36 from the time-division wireless communication mode 34 to the network topology construction mode 30.

Thus, when the determiner 40F determines to switch the communication mode 36, the time-division wireless communication mode 34 is interrupted, and the network topology construction mode 30 is executed again.

Next, the display controller 40H is described. The display controller 40H performs control of displaying various kinds of information on the display 46. In the present embodiment, the display controller 40H performs control of displaying a display screen on the display 46.

The display screen is a screen indicating the progress of first processing in the network topology construction mode 30 and second processing in the time-division wireless communication mode 34.

Figure 7:
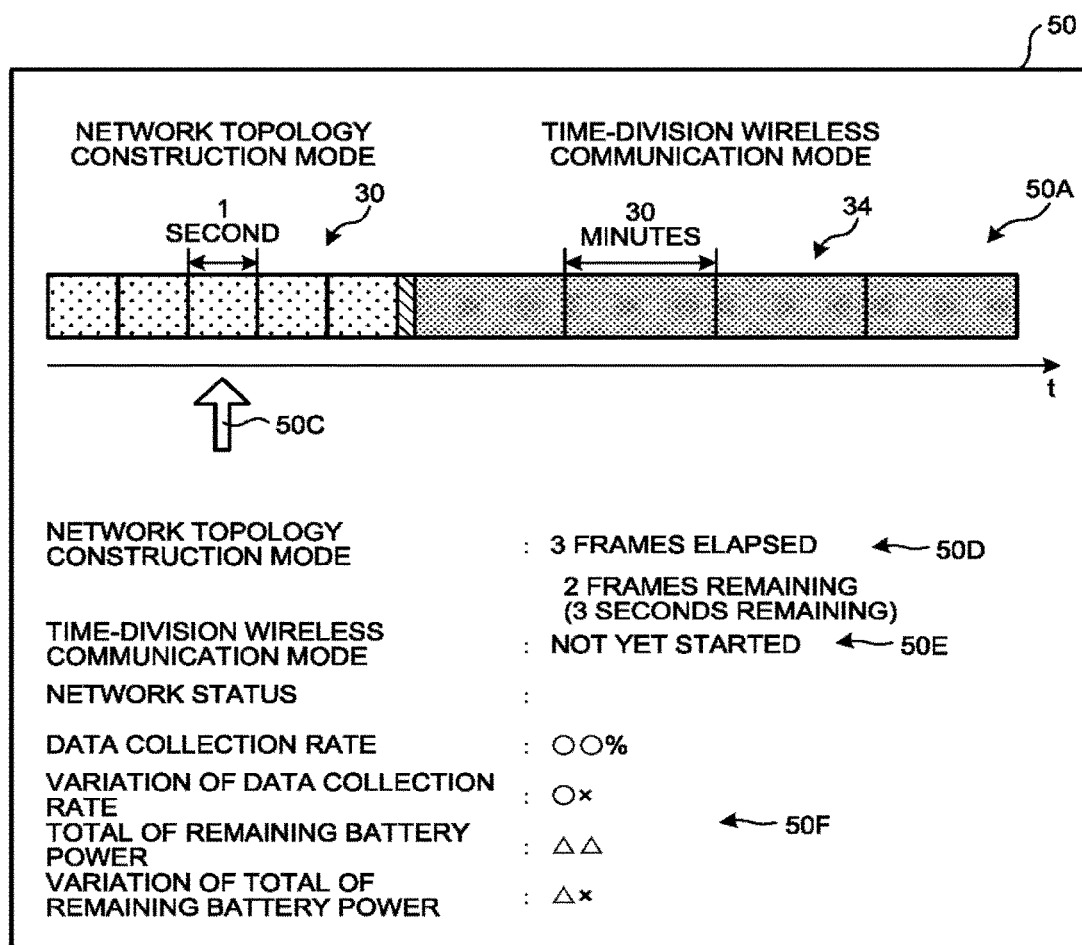
FIG. 7 is a schematic diagram of a display screen.

FIG. 7 is a schematic diagram illustrating an example of a display screen 50. For example, the display controller 40H performs control of outputting a display signal and displaying the display screen 50 on the display 46.

The display screen 50 includes an image 53A representing a timeline indicating the progress of the network topology construction mode 30 and the time-division wireless communication mode 34. The image 50A includes an image 50C indicating the current processing position in the timeline represented by the image 50A.

The display screen 50 further includes character information 50D indicating the progress of the network topology construction mode 30. In the example illustrated in FIG. 7, information indicating that three frames have now elapsed in the network topology construction mode 30, information indicating the remaining time until the end of the network topology construction mode 30, and information indicating the remaining number of frames are displayed as character information.

The display screen 50 further includes information 50E indicating whether the time-division wireless communication mode 34 has started.

The display screen 50 further includes information 50F indicating a network status of the wireless communication system 100 in the time-division wireless communication mode 34. In the example illustrated in FIG. 7, information indicating the data collection rate, a variation of the data collection rate, total remaining battery power, and a variation of the total remaining battery power is displayed as the information 50F indicating the network state.

The data collection rate indicates the rate of data collection from wireless communication devices 10 to the aggregation device 20 included in network topology constructed in the network topology construction mode 30. The variation of the data collection rate indicates a variation per unit time of the rate of data collection by the aggregation device 20.

The total remaining battery power indicates the total of the remaining battery power of each of the wireless communication devices 10 included in network topology constructed in the network topology construction mode 30. The variation of the total remaining battery power indicates a variation per nit time of the total remaining battery power.

Each piece of information indicating the network state is collected by the aggregation device 20 when time-division wireless communication is performed in the time-division wireless communication period D, and is delivered to each wireless communication device 10.

Figure 8:
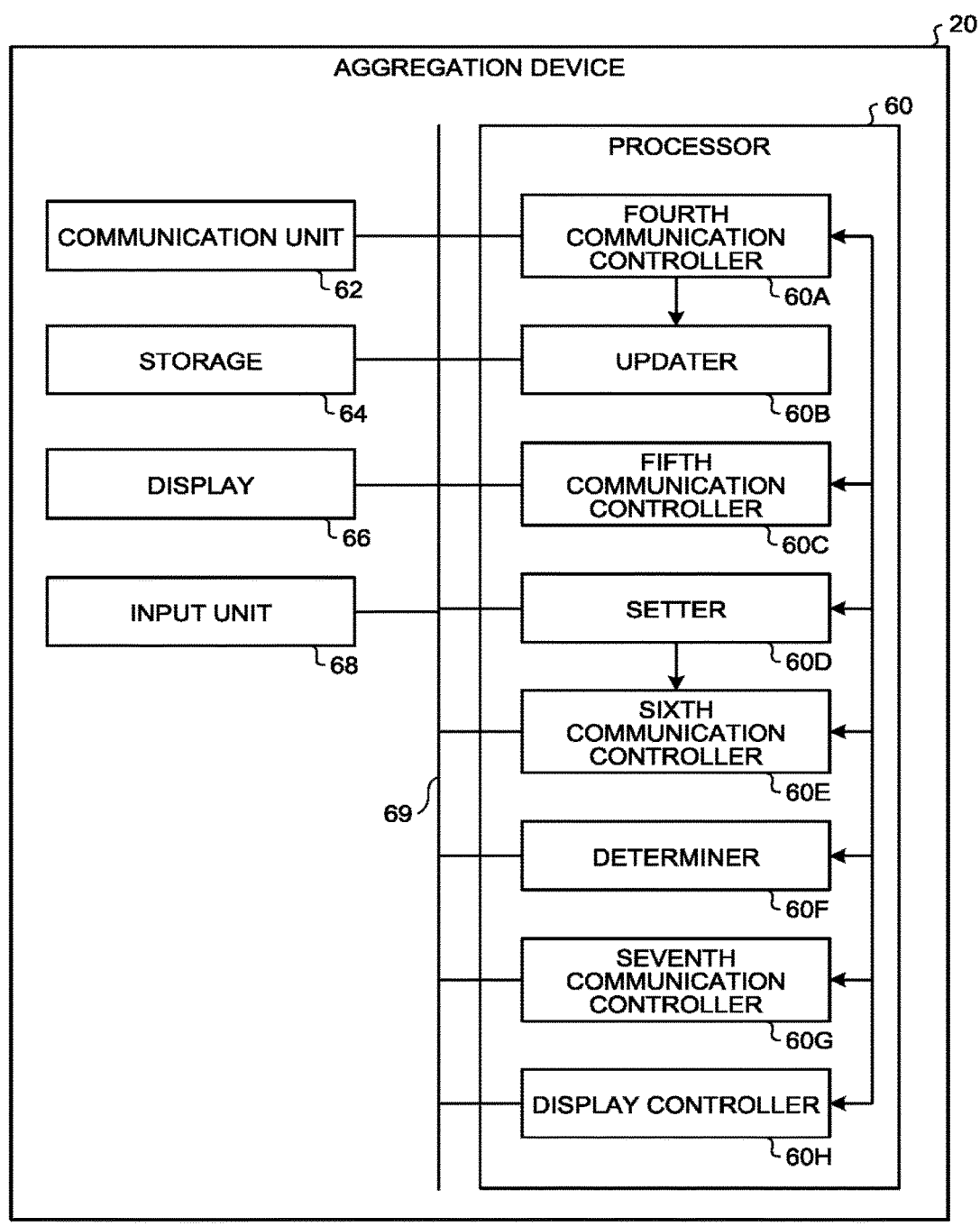
FIG. 8 is a schematic diagram of a functional configuration of the aggregation device.

Next, the functional configuration of the aggregation device 20 is described. FIG. 8 is a schematic diagram illustrating an example of the functional configuration of the aggregation device 20.

The aggregation device 20 includes a processor 60, a communication unit 62, a storage 64, a display 66, and an input unit 68. The processor 60, the communication unit 62, the storage 64, the display 66, and the input unit 68 are connected via a bus 69.

The communication unit 62 performs wireless communication with the wireless communication devices 10. The communication unit 62 is, for example, a communication antenna. The storage 64 stores therein various kinds of data. The storage 64 is, for example, a semiconductor memory element such as a RAM and a flash memory, a hard disk, or an optical disc. The storage 64 may be formed of a plurality of storage media.

In the present embodiment, the storage 64 stores therein connection destination information and the like. The connection destination information is updated by processing described later. The display 66 displays various kinds of information. The display 66 is a publicly known display. In the present embodiment, the display 66 displays a display screen generated by the processor 60.

The input unit 68 is an input device configured to receive an instruction from a user. The input unit 68 for example, a mouse, a keyboard, or a touch pen. The display 66 and the input unit 68 may be integrated together. In this case, the display 66 and the input unit 68 are, for example, a touch panel.

The processor 60 executes various kinds of processing in the aggregation device 20. The processor 60 includes a fourth communication controller 60A, an updater 60B, a fifth communication controller 60C, a setter 60D, a sixth communication controller 60E, a determiner 60F, and a seventh communication controller 60G. The processor 60 may further include a display controller 60H. The fourth communication controller 60A, the updater 60B, the fifth communication controller 60C, the setter 60D, the sixth communication controller 60E, the determiner 60F, the seventh communication controller 60G, and the display controller 60H are implemented by, for example one or more processors. For example, each of the above-mentioned units may be implemented by a processor such as a CPU executing a computer program, that is, by software. Each of the above-mentioned units may be implemented by a processor such as a dedicated IC, that is, by hardware. Each of the above-mentioned units may be implemented by a combination of software and hardware. When processors are used, each processor may implement one of the units or implement two or more of the units.

The processor implements each of the above-mentioned units by reading and executing computer programs stored in the storage 64. A computer program may be directly incorporated in a circuit of the processor instead of storing a computer program in the storage 64. In this case, the processor implements each of the above-mentioned units by reading and executing the computer programs incorporated in the circuit.

The fourth communication controller 60A controls the communication unit 62 and the updater 60B to execute the network topology construction mode 30 in the network topology construction period C.

The network topology construction mode 30 in the aggregation device 20 is similar t that in the wireless communication device 10. Specifically, in the aggregation device 20, a series of first processing involving the communication of communication connection information with the wireless communication device 10 and the update of connection destination information based on the communication connection information is performed in the network topology construction period C for every first cycle A.

The fourth communication controller 60A only needs to perform the first processing by specifying the network topology construction period C from period information indicating the network topology construction period C set by the setter 60D described later.

The fourth communication controller 60A controls the updater 60B each time new communication connection information is received from the wireless communication device 10. The updater 60B uses the received communication connection information to generate connection destination information, and overwrites and stores the connection destination information in the storage 64. The connection destination information can be generated by using a publicly known method. Specifically, the updater 60B updates the connection destination information under control of the fourth communication controller 60A. Thus, the connection destination information in the storage 64 is updated under control of the fourth communication controller 60A.

The fourth communication controller 60A controls the communication unit 62 and the updater 60B to repeatedly execute first processing for every first cycle A in the network topology construction period C. Thus, connection destination information that is overwritten at the last in the network topology construction period C is decided as connection destination information in the aggregation device 20, and is used in the time-division wireless communication mode 34.

In other words, the connection destination information is decided in the network topology construction period C in each of wireless communication devices 10 and the aggregation device 20 included in the wireless communication system 100, with the result that the network topology of the wireless communication system 100 is constructed.

Next, the fifth communication controller 60C is described. The fifth communication controller 60C executes the time-division wireless communication mode 34 in which the second processing is performed for every second cycle C. The second processing has been described above, and its description is thus omitted. Specifically, the fifth communication controller 60C executes the time-division wireless communication mode 34 in the time-division wireless communication period D.

A communication slot the aggregation device 20 is set in advance. For example, as illustrated in FIG. 4, the latest slot in a frame is allocated in advance as a communication slot for the aggregation device 20.

Thus, the fifth communication controller 60C in the aggregation device 20 communicates communication information in the time-division wireless communication period D for every second cycle B at the timing corresponding to the communication slot allocated to the aggregation device 20 in the frame.

The setter 60D sets period information indicating the network topology construction period C in the wireless communication system 100.

The setter 60D specifies the maximum number of hops in the wireless communication system 100 in which network topology is constructed. The maximum number of hops refers to the maximum number of hops to the aggregation device 20 in the wireless communication system 100 in which network topology is constructed.

For example, the setter 60D specifies the maximum number of hops in the network topology constructed the time of the execution of the previous time-division wireless communication mode 34. The setter 60D sets the product of the maximum number of hops and the first cycle A as period information indicating a network topology construction period C in the network topology construction mode 30 executed next.

For another example, the setter 60D specifies the number of wireless communication devices 10 included in the wireless communication system 100 in which network topology is constructed. For example, the setter 60D specifies the number of wireless communication devices 10 included in the network topology that is constructed at the time of the execution of the previous time-division wireless communication mode 34. The setter 60D sets the product of the number of wireless communication devices 10 and the first cycle A as period information indicating a network topology construction period C in the network topology construction mode 30 executed next.

The setter 60D may set period information indicating a network topology construction period C in the next network topology construction mode 30 after the end of the network topology construction mode 30. For example, the setter 60D sets, between the network topology construction mode 30 and the time-division wireless communication mode 34, period information indicating a network topology construction period C in the next network topology construction mode 30. In the time-division wireless communication period D, the setter 60D may set period information indicating a network topology construction period C in the next network topology construction mode 30.

The sixth communication controller 60E transmits the period information set by the setter 60D to the wireless communication devices 10 included in the wireless communication system 100. For example, the sixth communication controller 60E transmits communication connection information including the set period information to the wireless communication devices 10 at the time when the next network topology construction mode 30 is executed. The sixth communication controller 60E transmits the set period information to the fourth communication controller 60A.

Thus, when the next network topology construction mode 30 is executed, the wireless communication devices 10 and the aggregation device 2C can execute the network topology construction mode 30 during the network topology construction period C indicated by the period information set by the setter 60D.

Next, the determiner 60F is described. The determiner 60F determines, in accordance with the network state of the wireless communication system 100, whether to execute the switching of the communication mode 36 from the time-division wireless communication mode 34 to the network topology construction mode 30.

The network state refers to the communication state of each of wireless communication devices 10 and the remaining battery power of each of wireless communication devices 10 included in the wireless communication system 100 in which network topology is constructed.

Specifically, as described above, the network state includes the data collection rate, a variation of the data collection rate, the total remaining battery power, and a variation of the total remaining battery power.

For example, the determiner 60F determines to execute the switching from the time-division wireless communication mode 34 to the network topology construction mode 30 when the rate of data collection from the wireless communication devices 10 included in the wireless communication system 100 becomes equal to or smaller than a first threshold in the time-division wireless communication period D. The first threshold is determined in advance.

For example, the determiner 60F determines to execute the switching from the time-division wireless communication mode 34 to the network topology construction mode 30 when the variation of the data collection rate becomes equal to or larger than a second threshold in the time-division wireless communication period D. The second threshold is determined in advance.

The determiner 60F determines to execute the switching from the time-division wireless communication mode 34 to the network topology construction mode 30 when the total remaining battery power of the wireless communication devices 10 becomes equal to or smaller than a third threshold.

The total remaining battery power is the total of the remaining battery power of the wireless communication devices 10 included in the wireless communication system 100. In this case, each of the wireless communication devices 10 included in the wireless communication system 100 transmits communication information including the remaining battery power of the wireless communication device 10 to the aggregation device 20 when executing the time-division wireless communication mode 34. The determiner 60O derives the total of the remaining battery power by using information indicating the remaining battery power included in the communication information received from each of the wireless communication devices 10 included in the wireless communication system 100. The third threshold is determined in advance.

For example, the determiner 60F may determine to execute the switching from the time-division wireless communication mode 34 to the network topology construction mode 30 when the variation of the total of the remaining battery power of the wireless communication devices 10 becomes equal to or larger than a fourth threshold. The fourth threshold may be set in advance.

The seventh communication controller 60G transmits, when the determiner 60F determines to execute the switching from the network topology construction mode 30 to the time-division wireless communication mode 34, switching instruction information indicating a switching instruction to the wireless communication devices 10 included in the wireless communication system 100.

For example, the seventh communication controller 60G only needs to transmit communication information including switching instruction information to each wireless communication device 10 in the wireless communication system 100 during the execution of the time-division wireless communication mode 34.

In this manner, each wireless communication device 10 that has received the switching instruction information can switch the communication mode 36 from the time-division wireless communication mode 34 to the network topology construction mode 30.

When the determiner 60F determines to execute the switching, the fifth communication controller 60C and the fourth communication controller 60A are controlled to switch the time-division wireless communication mode 34 to the network topology construction mode 30.

Specifically, the determiner 60F controls the fifth communication controller 60C and the fourth communication controller 60A to switch the communication mode 36 to the network topology construction mode 30 when at least one of the following conditions is satisfied: the condition that the elapsed time from the start of the execution of the time-division wireless communication mode 34 has exceeded a predetermined time, that condition that the number of times of execution of the second processing from the start of the execution of the time-division wireless communication mode 34 has exceeded a predetermined number of times, and the condition that it is determined to switch the communication mode 36 to the network topology construction mode 30.

The same values of the predetermined time and the predetermined number of times are used in all of the wireless communication devices 10 and the aggregation device 20 included in the wireless communication system 100. Thus, also in the aggregation device 20, the communication mode is switched from the time-division wireless communication mode 34 to the network topology construction mode 30 at the same timing as that in the wireless communication device 10.

The switching from the time-division wireless communication mode 34 to the network topology construction mode 30 in each of the wireless communication devices 10 and the aggregation device 20 included in the wireless communication system 100 is adjusted by publicly known synchronization processing so as to be performed at the timing.

Next, the display controller 60H is described. The display controller 60H performs control of displaying various kinds of information on the display 66. In the present embodiment, the display controller 60H performs control of displaying a display screen 50 on the display 66. The display screen 50 is the same as the display screen displayed on the wireless communication device 10 (see FIG. 7).

Figure 9:
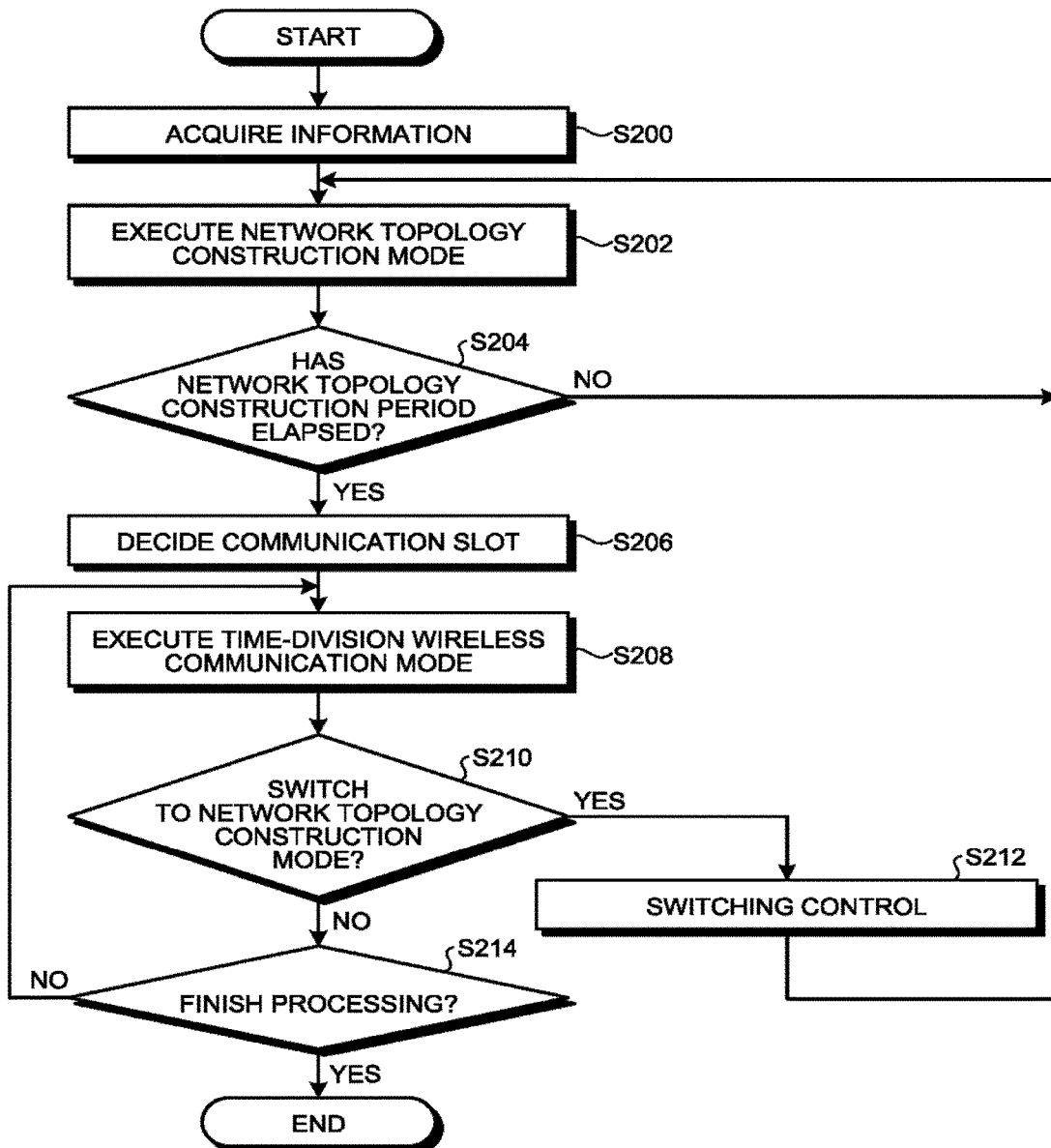
FIG. 9 is a flowchart of wireless communication processing.

Next, an example of a procedure of communication processing executed by the wireless communication device 10 is described. FIG. 9 is a flowchart illustrating an example of the procedure of the communication processing executed by the wireless communication device 10.

First, the acquirer 40A acquires period information, first cycle information, and second cycle information (Step S200).

Next, the first communication controller 40B controls the communication unit 42 and the updater 40C to execute the network topology construction mode 30 (Step S202). At Step S202, the first communication controller 40B repeatedly executes first processing for each first cycle A indicated by the first cycle information acquired at Step S200. In this manner, the first communication controller 40B executes the network topology construction mode 30.

Next, the first communication controller 40B determines whether an elapsed time from the start of the execution of the network topology construction mode 30 at Step S202 has exceeded a network topology construction period C indicated by the period information acquired at Step S200 (Step S204). When the determination at Step S204 is negative (No at Step 204), the flow returns to Step S202. On the other hand, when the determination at Step S204 is positive (Yes at Step S204), the flow proceeds to Step S206.

At Step S206, the decider 40D performs processing of deciding communication slots (Step S206).

Next, the second communication controller 40E executes the time-division wireless communication mode 34 (Step S208). The second communication controller 40E repeatedly executes second processing for each second cycle B indicated by the second cycle information acquired at Step S200.

Next, the determiner 40F determines whether to switch the communication mode 36 from the time-division wireless communication mode 34 to the network topology construction mode 30 (Step S210). As described above, the determiner 40F determines to switch the communication mode 36 when at least one of the conditions is satisfied: the condition that the elapsed time from the start of the execution of the time-division wireless communication mode 34 has exceeded a predetermined time; the condition that the number of times of execution of second processing from the start of the execution of the time-division wireless communication mode 34 has exceeded a predetermined number of times; and the condition that switching instruction information indicating a switching instruction is received (Yes at Step S210).

When the determination at Step S210 is positive (Yes at Step S210), the flow proceeds to Step S212. At Step S212, the third communication controller 40G controls the second communication controller 40E and the first communication controller 40B to switch the communication mode 36 from the time-division wireless communication mode 34 to the network topology construction mode 30 (Step S212). The flow returns to Step S202.

On the other hand, when the determination at Step S210 is negative (No at Step S210), the flow proceeds to Step S214. At Step S214, the processor 40 determines whether to finish the communication processing (Step S214). For example, the processor 40 makes the determination at Step S214 by determining whether the supply of power to the wireless communication device 10 has been interrupted.

When the determination at Step S214 is negative (No at Step S214), the flow returns to Step S208. On the other hand, when the determination at Step S214 is positive (Yes at Step S214), this routine is finished.

Figure 10:
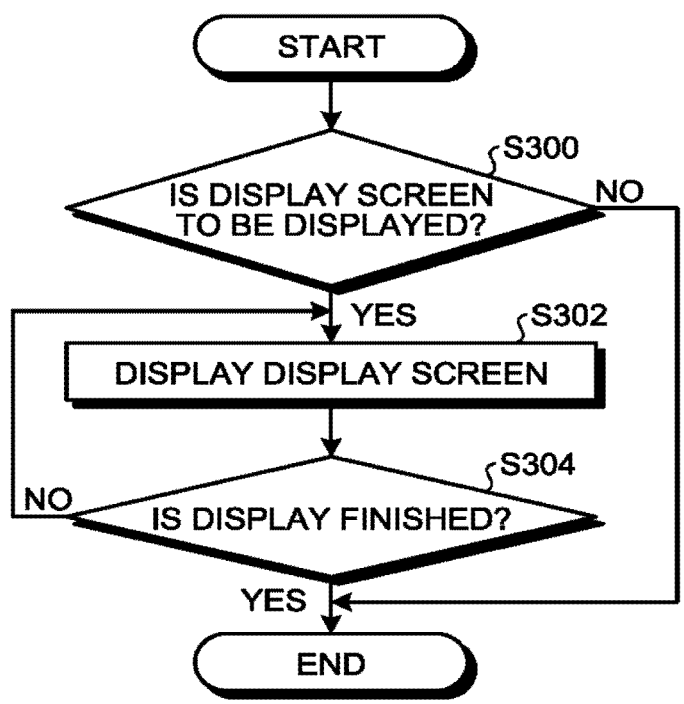
FIG. 10 is a flowchart of display control processing.

Next, display control processing executed by the wireless communication device 10 is described. FIG. 10 is a flowchart illustrating an example of a procedure of display control processing executed by the processor 40 in the wireless communication device 10.

The processor 40 in the wireless communication device 10 executes the display control processing when executing the communication processing illustrated in FIG. 9.

First, the display controller 40H determines whether to display the display screen 50 (Step S300). For example, a user operates the input unit 48 to input a display instruction to the display screen 50. Upon the reception of the display instruction, the input unit 48 outputs a display instruction signal indicating the display instruction to the processor 40. The display controller 40H in the processor 40 determines to display the display screen 50 when receiving the display instruction signal.

When the determination at Step S300 is negative (No at Step S300), this routine is finished. On the other hand, when the determination at Step S300 is positive (Yes at Step S300), the flow proceeds to Step S302.

At Step S302, the display controller 40H displays the display screen 50 on the display 46 (Step S302). Next, the display controller 40H determines whether to finish the display of the display screen 50 (Step S304).

For example, the user operates the input unit 48 to input an instruction to finish the display of the display screen 50. An instruction to prompt a transition to another screen is also included in the finish instruction. Upon the reception of the finish instruction, the input unit 48 outputs a finish instruction signal to the processor 40. The display controller 40H makes the determination at Step S304 by determining whether the finish instruction signal has been received.

When the determination at Step S304 is negative (No at Step S304), the flow returns to Step S302. On the other hand, when the determination at Step S304 is positive (Yes at Step S304), this routine is finished.

Figure 11:
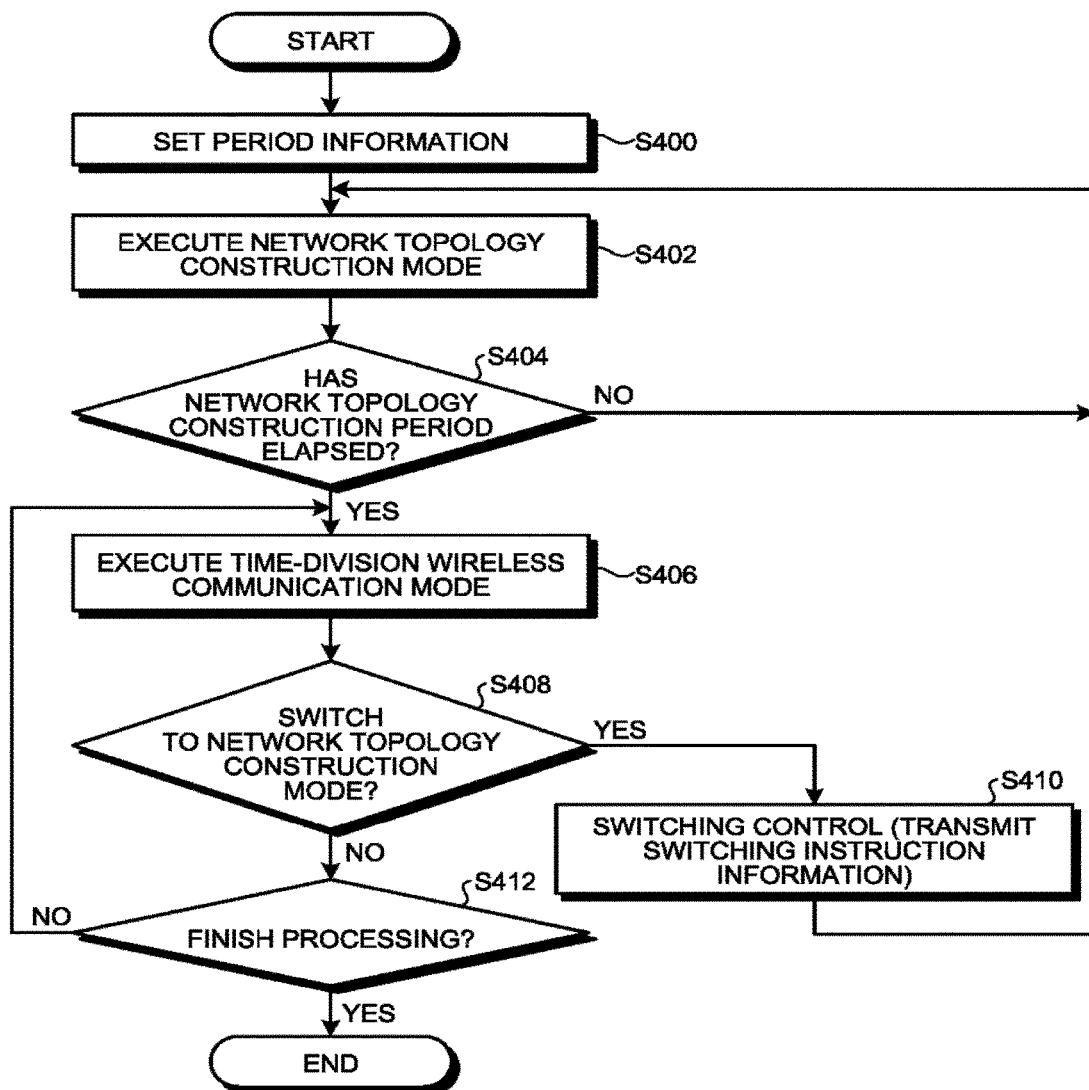
FIG. 11 is a flowchart of aggregation processing.

Next, an example of a procedure of aggregation processing executed by the aggregation device 20 is described. FIG. 11 is a flowchart illustrating an example of the procedure of the aggregation processing executed by the aggregation device 20.

First, the setter 60D sets period information on the network topology construction period C (Step S400).

Next, the fourth communication controller 60A controls the communication unit 62 and the updater 60B to execute the network topology construction mode 30 (Step S402). The fourth communication controller 60A transmits communication connection information including the period information set at Step S400 to the wireless communication device 10, and executes the network topology construction mode 30.

Next, the fourth communication controller 60A determines whether the elapsed time from the start of the execution of the network topology construction mode 30 at Step S402 has exceeded the network topology construction period C indicated by the period information set at Step S400 (Step S404). When the determination at Step S404 is negative (No at Step S404), the flow returns to Step S402. On the ether hand, when the determination at Step S404 is positive (Yes at Step S404), the flow proceeds to Step S406.

At Step S406, the fifth communication controller 60G executes the time-division wireless communication mode 34 (Step S406). The fifth communication controller 60C repeatedly executes second processing for every second cycle B indicated by second cycle information.

Next, the determiner 60F determines whether to switch the communication mode 36 from the time-division wireless communication mode 34 to the network topology construction mode 30 (Step S408). The determiner 60F determines to switch the communication mode 36 when at least one of the following conditions is satisfied: the condition that the elapsed time from the start of the execution of the time-division wireless communication mode 34 has exceeded a predetermined time; the condition that the number of times of execution of second processing from the start of the execution of the time-division wireless communication mode 34 has exceeded a predetermined number of times; and the condition that it is determined to switch to the network topology construction mode 30 (Yes at Step S408).

When the determination at Step S408 is positive (Yes at Step S408), the flow proceeds to Step S410. At Step S410, the seventh communication controller 60G transmits switching instruction information to the wireless communication device 10 (Step S410). The flow returns to Step S402.

On the other hand, when the determination at Step S408 is negative (No at Step S408), the flow proceeds to Step S412. At Step S412, the processor 60 determines whether to finish the aggregation processing (Step S412).

When the determination at Step S412 is negative (No at Step S412), the flow returns to Step S406. On the other hand, when the determination at Step S412 is positive (Yes at Step S412), this routine is finished.

Figure 12:
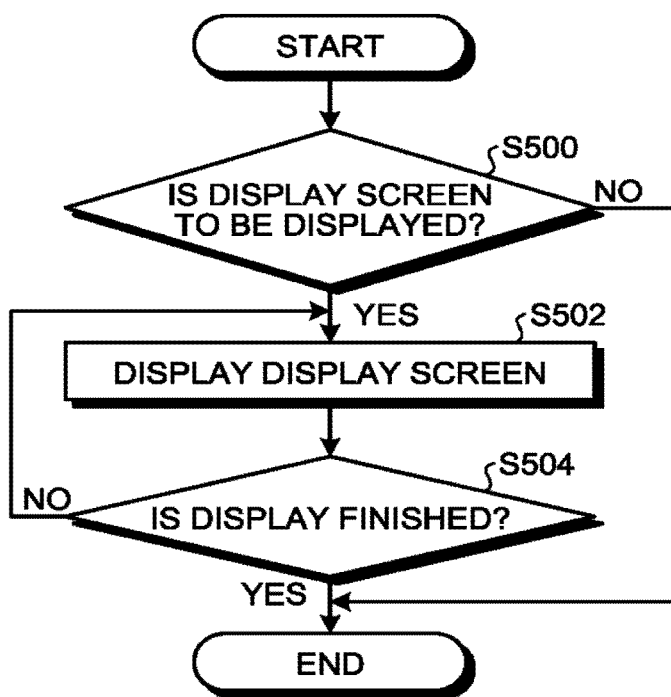
FIG. 12 is a flowchart of display control processing.

Next, display control processing executed by the aggregation device 20 is described. FIG. 12 is a flowchart illustrating an example of a procedure of display control processing executed by the processor 60 in the aggregation device 20.

The processor 60 in the aggregation device 20 executes the display control processing when executing the aggregation processing illustrated in FIG. 11.

First, the display controller 60A determines whether to display the display screen 50 (Step S500). For example, a user operates the input unit 68 to input a display instruction to the display screen 50. Upon the reception of the display instruction, the input unit 68 outputs a display instruction signal indicating the display instruction to the processor 60. The display controller 60H in the processor 60 determines to display the display screen 50 when receiving the display instruction signal.

When the determination at Step S500 is negative (No at Step S500), this routine is finished. On the other hand, when the determination at Step S500 is positive (Yes at Step S500), the flow proceeds to Step S502.

At Step S502, the display controller 60H displays the display screen 50 on the display 66 (Step S502). Next, the display controller 60H determines whether to finish the display of the display screen 50 (Step S504). When the determination at Step S504 is negative (No at Step S504), the flow returns to Step S502. On the other hand, when the determination at Step S504 is positive (Yes at Step S504), this routine is finished.

As described above, the wireless communication device 10 in the present embodiment is one of a plurality of wireless communication devices 10 constituting the wireless communication system 100, and has the network topology construction mode 30 and the time-division wireless communication mode 34. The first cycle A as the communication cycle in the network topology construction mode 30 is shorter than the second cycle B as the communication cycle in the time-division wireless communication mode 34.

In this manner, the wireless communication device 10 in the present embodiment executes first processing in the network topology construction mode 30 for every first cycle shorter than the second cycle B that is the communication cycle in the time-division wireless communication mode 4. Consequently, the wireless communication device 10 in the present embodiment can reduce the network topology construction period C for constructing network topology used in time-division wireless communication.

Thus, the wireless communication device 10 in the present embodiment can reduce network topology construction time.

Furthermore, the wireless communication system 100 in the present embodiment can construct network topology with minimum power consumption. Furthermore, the wireless communication system 100 in the present embodiment can reduce a failure of data collection at the start of the execution of the time-division wireless communication mode 34.

Figure 13:
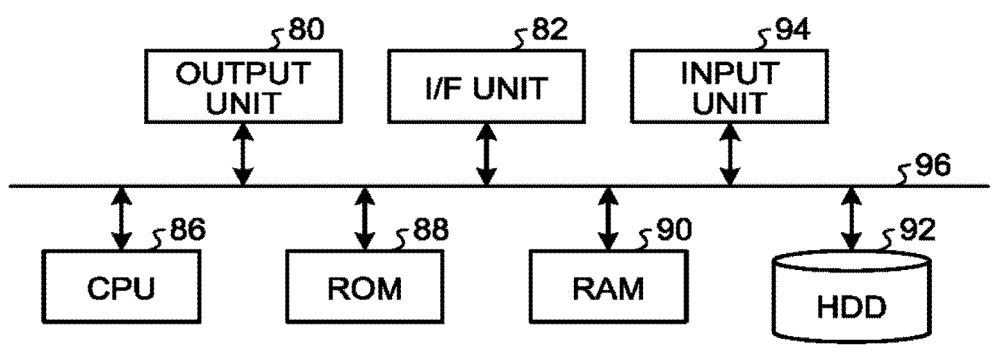
FIG. 13 is a hardware configuration diagram.

Next, an example of a hardware configuration of the wireless communication device 10 and the aggregation device 20 according to the above-mentioned embodiment is described. FIG. 13 is an example of a hardware configuration diagram of the wireless or unication device 10 and the aggregation device 20 according to the above-mentioned embodiment.

The wireless communication device 10 and the aggregation device 20 according to the above-mentioned embodiment have a hardware configuration using a general computer, and include a control device such as a CPU 86, a storage device such as a read only memory (ROM) 88, a random access memory (RAM) 90, and a hard disk drive (HDD) 92, an I/F unit 82 as an interface for various kinds of devices, an output unit 80 to output various kinds of information, an input unit 94 to receive operation by a user, and a bus 96 to connect each unit.

In the wireless communication device 10 and the aggregation device 20 in the above-mentioned embodiment, the CPU 86 reads a computer program from the ROM 88 onto the RAM 90 and executes the read computer program, so that each of the above-mentioned units is implemented on the computer.

Computer programs for executing the above-mentioned processing executed by the wireless communication devices 10 and the aggregation device 20 according to the above-mentioned embodiment may be stored in the HDD 92. Computer programs for executing each of the above-mentioned processing executed by the wireless communication devices it and the aggregation device 20 according to the above-mentioned embodiment may be provided by being incorporated in the ROM 88 in advance.

Computer programs for executing the above-mentioned processing executed by the wireless communication devices 10 and the aggregation device 20 according to the above-mentioned embodiment may be recorded in a computer-readable storage medium, such as a CD-ROM, a CD-R, a memory card, a digital versatile disc (DVD), and a flexible disk (FD), in an installable format or an executable format, and provided as a computer program product. Computer programs for executing the above-mentioned processing executed by the wireless communication devices 10 and the aggregation device 20 according to the above-mentioned embodiment may be stored on a computer connected to a network such as the Internet, and provided by being downloaded via the network. Computer programs for executing the above-mentioned processing executed by the wireless communication devices 10 and the aggregation device 20 according to the above-mentioned embodiment may be provided or distributed via a network such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without depart-

What is claimed is:

1. A wireless communication device that is one of a plurality of wireless communication devices constituting a wireless communication system, the device comprising one or more processors configured to have a network topology construction mode and a time-division wireless communication mode, wherein
a first cycle as a communication cycle in the network topology construction mode is shorter than a second cycle as a communication cycle in the time-division wireless communication mode;
the one or more processors are further configured to:
communicate communication connection information with another wireless communication device to set a connection destination based on the communication connection information, for every first cycle in the network topology construction mode,
transmit communication information in a slot group earlier than a slot group through which a latest connection destination at an end of the network topology construction mode transmits the communication information among a plurality of slot groups included in the second cycle, in the time-division wireless communication mode,
acquire period information indicative of a network topology construction period in the wireless communication system, and
execute the network topology construction mode for the network topology construction period indicated by the period information; and
the first cycle is longer than a time required for transmission of the communication connection information of another wireless communication device that is connected to the wireless communication device as a parent node.

2. The device according to claim 1, wherein connection destination information included in the communication connection information includes number of hops from the wireless communication device to an aggregation device, first identification information of the another wireless communication device that is a parent node of the wireless communication device, and second identification information of another wireless communication device that is a child node of the wireless communication device.

3. The device according to claim 1, wherein the one or more processors are further configured to determine whether to switch between the time-division wireless communication mode and the network topology construction mode.

4. The device according to claim 3, wherein the one or more processors are further configured to determine to switch between the time-division wireless communication mode and the network topology construction mode when at least one of the following conditions is satisfied: an elapsed time from start of execution of the time-division wireless communication mode has exceeded a predetermined time; number of times of execution of second processing for communicating the communication information from start of execution of the time-division wireless communication mode has exceeded a predetermined number of times; and switching instruction information indicating a switching instruction is received.

5. A wireless communication system comprising:
wireless communication devices; and
an aggregation device configured to aggregate information received from the communication devices, wherein
a first cycle as a communication cycle in a network topology construction mode is shorter than a second cycle as a communication cycle in a time-division wireless communication mode;
each of the wireless communication devices comprising one or more processors configured to:
communicate communication connection information with another wireless communication device to set a connection destination based on the communication connection information, for every first cycle in the network topology construction mode,
transmit communication information in a slot group earlier than a slot group through which a latest connection destination at an end of the network topology construction mode transmits the communication information among a plurality of slot groups included in the second cycle, in the time-division wireless communication mode,
acquire period information indicative of a network topology construction period in the wireless communication system, and
execute the network topology construction mode for the network topology construction period indicated by the period information; and
the first cycle being longer than a time required for transmission of the communication connection information of another wireless communication device that is connected to the wireless communication device as a parent node.

6. A non-transitory computer-readable medium containing computer-readable instructions which, when executed by a computer of a wireless communication device included in a wireless communication system, cause the computer to perform a method comprising:
executing a network topology construction mode at a communication cycle of a first cycle;
executing a time-division wireless communication mode at a communication cycle of a second cycle longer than the first cycle;
communicating communication connection information with another wireless communication device to set a connection destination based on the communication connection information, for every first cycle in the network topology construction mode;
transmitting communication information in a slot group earlier than a slot group through which a latest connection destination at an end of the network topology construction mode transmits the communication information among a plurality of slot groups included in the second cycle, in the time-division wireless communication mode;
acquiring period information indicative of a network topology construction period in the wireless communication system; and
executing the network topology construction mode for the network topology construction period indicated by the period information, wherein
the first cycle is longer than a time required for transmission of the communication connection information of another wireless communication device that is connected to the wireless communication device as a parent node.

* * * * *